US011727949B2

(12) United States Patent
Kleinberger et al.

(10) Patent No.: US 11,727,949 B2
(45) Date of Patent: Aug. 15, 2023

(54) METHODS AND APPARATUS FOR REDUCING STUTTERING

(71) Applicants: Massachusetts Institute of Technology, Cambridge, MA (US); The Brigham and Women's Hospital, Inc., Boston, MA (US)

(72) Inventors: Rebecca Kleinberger, Cambridge, MA (US); Michael Erkkinen, Cambridge, MA (US); George Stefanakis, Jamaica, NY (US); Akito van Troyer, Cambridge, MA (US); Satrajit Ghosh, Wayland, MA (US); Janet Baker, West Newton, MA (US); Tod Machover, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 267 days.

(21) Appl. No.: 16/983,974

(22) Filed: Aug. 3, 2020

(65) Prior Publication Data
US 2021/0050029 A1 Feb. 18, 2021

Related U.S. Application Data

(60) Provisional application No. 62/885,316, filed on Aug. 12, 2019.

(51) Int. Cl.
*G06F 15/00* (2006.01)
*G10L 25/00* (2013.01)
(Continued)

(52) U.S. Cl.
CPC .............. *G10L 21/013* (2013.01); *G06F 3/16* (2013.01); *G10L 17/00* (2013.01); *G10L 21/003* (2013.01);
(Continued)

(58) Field of Classification Search
CPC .......... G10L 21/003; G10L 2021/0135; G10L 19/005; G10L 17/00; G10L 21/0364;
(Continued)

(56) References Cited

U.S. PATENT DOCUMENTS 4,020,567 A 5/1977 Webster
4,421,488 A * 12/1983 Parlenvi .................... A61F 5/58
381/1
(Continued)

FOREIGN PATENT DOCUMENTS

WO WO-2013013319 A1 * 1/2013 ............. G10H 1/366

OTHER PUBLICATIONS

De Cheveigné, Alain, and Hideki Kawahara. "YIN, a fundamental frequency estimator for speech and music." The Journal of the Acoustical Society of America 111.4 (2002): 1917-1930. (Year: 2002).*

(Continued)

*Primary Examiner* — Michael Ortiz-Sanchez
(74) *Attorney, Agent, or Firm* — Daly, Crowley, Mofford & Durkee, LLP

(57) ABSTRACT

A feedback system may play back, to a user, an altered version of the user's voice in real time, in order to reduce stuttering by the user. The system may operate in different feedback modes at different times. For instance, the system may detect when the severity of a user's stuttering increases, which is indicative of the user habituating to the current feedback mode. The system may then switch to a different feedback mode. In some cases, the feedback modes include at least a Whisper mode, a Reverb mode, and a Harmony mode. In Whisper mode, the user's voice may be transformed to sound as if it were whispering in the user's ears. In Harmony mode, the user's voice may be altered as if the
(Continued)

user were harmonizing with himself or herself. In Reverb mode, the user's voice may be altered so that it reverberates.

24 Claims, 5 Drawing Sheets

(51) Int. Cl.
| | |
|---|---|
| *G10L 21/013* | (2013.01) |
| *G10L 21/034* | (2013.01) |
| *G06F 3/16* | (2006.01) |
| *H04R 3/04* | (2006.01) |
| *G10L 17/00* | (2013.01) |
| *G10L 21/003* | (2013.01) |
| *G10L 21/02* | (2013.01) |

(52) U.S. Cl.
 CPC ............ *G10L 21/02* (2013.01); *G10L 21/034* (2013.01); *H04R 3/04* (2013.01)

(58) Field of Classification Search
 CPC ............... G10L 21/034; G10L 21/0332; G10L 21/0324; G10L 21/0208; G10L 2021/02085; G10L 21/02; G10L 25/90; G10L 19/012; G10L 21/013; G10L 21/01; G10L 21/007; G10L 25/48; G10L 17/02; G10L 17/22; G10L 19/00; G10L 2021/065; H04R 3/04; H04R 1/00; H04R 2400/01; G06F 3/16; G06F 3/165; G06F 3/167; G09B 5/04; G09B 19/04; G09B 5/00; G10H 2210/251; G10H 1/10; G10H 1/38; G10H 2210/325; G10H 2210/281
 See application file for complete search history.

(56) References Cited

U.S. PATENT DOCUMENTS

| | | | |
|---|---|---|---|
| 4,662,847 | A | 5/1987 | Blum |
| 4,685,448 | A | 8/1987 | Shames et al. |
| 5,940,798 | A | 8/1999 | Houde |
| 5,961,443 | A | 10/1999 | Rastatter et al. |
| 6,231,500 | B1 | 5/2001 | Kehoe |
| 6,754,632 | B1 | 6/2004 | Kalinowski et al. |
| 6,944,497 | B2 | 9/2005 | Stypulkowski |
| 7,292,985 | B2 | 11/2007 | Jiang et al. |
| 7,591,779 | B2 | 9/2009 | Kalinowski et al. |
| 7,874,977 | B2 | 1/2011 | Pitulia |
| 7,974,845 | B2 | 7/2011 | Spiridigliozzi et al. |
| 9,826,929 | B2 | 11/2017 | Steinberg-Shapira et al. |
| 2006/0122826 | A1* | 6/2006 | Jiang ........................ A61F 5/58 704/205 |
| 2006/0193671 | A1* | 8/2006 | Yoshizawa ............ G10L 19/005 400/208 |
| 2010/0195812 | A1* | 8/2010 | Florencio ................. H04M 3/56 379/202.01 |
| 2012/0265537 | A1* | 10/2012 | Deshmukh .......... G10L 21/0364 704/271 |
| 2016/0189565 | A1* | 6/2016 | Rot ........................ A61B 5/742 434/185 |
| 2019/0231583 | A1* | 8/2019 | Rashid ................ G10L 21/0208 |

OTHER PUBLICATIONS

Czyzewski, Andrzej, Andrzej Kaczmarek, and Bozena Kostek. "Intelligent processing of stuttered speech." Journal of Intelligent Information Systems 21.2 (2003): 143-171. (Year: 2003).*
Świetlicka, Izabela, Wiesława Kuniszyk-Jóźkowiak, and Elżbieta Smołka. "Hierarchical ANN system for stuttering identification." Computer Speech & Language 27.1 (2013): 228-242. (Year: 2013).*
Baxter, S., et al., The state of the art in non-pharmacological interventions for developmental stuttering. Part 1: a systematic review of effectiveness; published in International Journal of Language & Communication Disorders, vol. No. 5, pp. 676-718, Jun. 2015.
Lincoln, M., et al., Altered auditory feedback and the treatment of stuttering: A review; published in Journal of Fluency Disorders, vol. 31, issue 2, pp. 71-89 (2006).
Lincoln, M., et al., An Experimental Investigation of the Effect of Altered Auditory Feedback on the Conversational Speech of Adults Who Stutter; published in Journal of Speech, Language, and Hearing Research, vol. 53, pp. 1122-1131, Oct. 2010.
Ritto, A., et al.; Randomized clinical trial: the use of SpeechEasy® in stuttering treatment; published in International Journal of Language & Communication Disorders, vol. 51, No. 6, pp. 769-774, Jun. 2016.
Saltuklaroglu, T., et al., Comparisons of stuttering frequency during and after speech initiation in unaltered feedback, altered auditory feedback and choral speech conditions; published in International Journal of Language & Communication Disorders, vol. 44, No. 6, pp. 1000-1017 (Nov. 2009).
Toyomura, A., et al., Effect of external auditory pacing on the neural activity of stuttering speakers, published in Neuroimage, 15; 57(4) (May 2011).

* cited by examiner

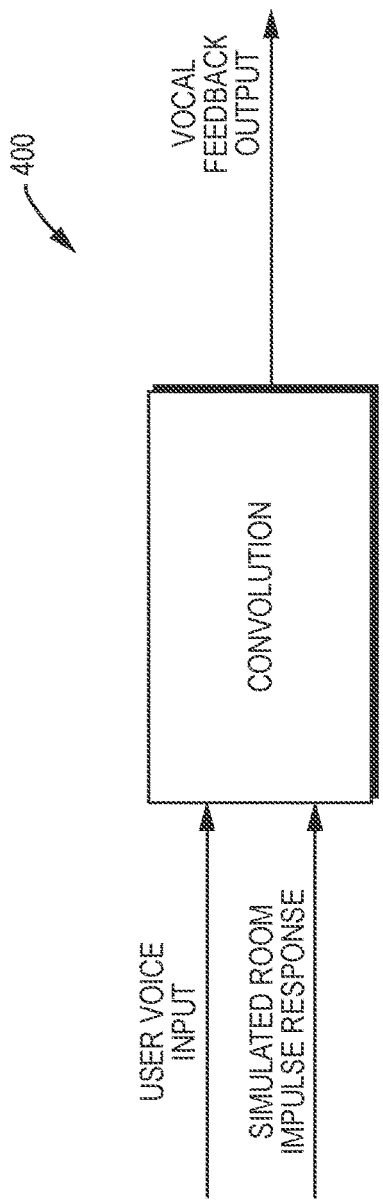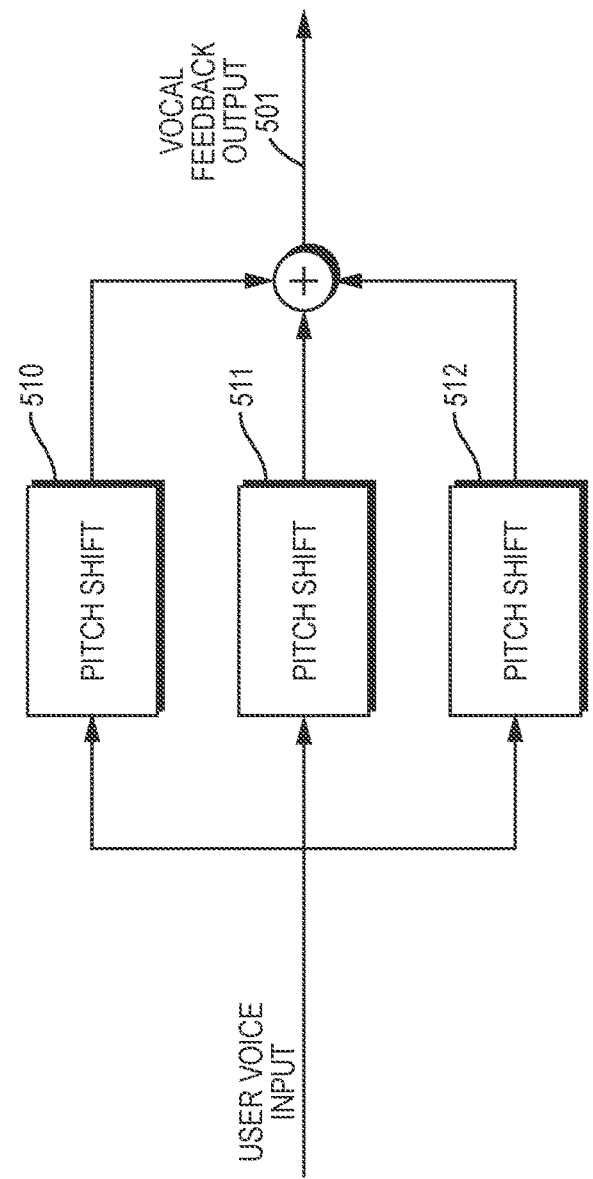

METHODS AND APPARATUS FOR REDUCING STUTTERING

RELATED APPLICATIONS

This application claims the benefit of U.S. Provisional Application No. 62/885,316 filed Aug. 12, 2019 (the "Provisional").

FIELD OF TECHNOLOGY

The present invention relates generally to feedback of an altered version of a user's voice, in order to reduce the user's stuttering while speaking.

COMPUTER PROGRAM LISTING

The following fourteen computer program files are incorporated by reference herein: (1) AudioProcessor_h.txt with a size of about 3 KB; (2) AudioProcessor_mm.txt with a size of about 10 KB; (3) Harmonizer_h.txt with a size of about 2 KB; (4) Harmonizer_mm.txt with a size of about 3 KB; (5) NEFFT_h.txt with a size of about 4 KB; (6) NEFFT_mm.txt with a size of about 3 KB; (7) PitchShifter_h.txt with a size of about 3 KB; (8) PitchShifter_mm.txt with a size of about 3 KB; (9) Reverb_h.txt with a size of about 1 KB; (10) Reverb_mm.txt with a size of about 2 KB; (11) StutterProcessor_h.txt with a size of about 2 KB; (12) StutterProcessor_mm.txt with a size of about 2 KB; (13) Whisper_h.txt with a size of about 2 KB; and (14) Whisper_mm.txt with a size of about 2 KB. Each of these fourteen files were created as an ASCII .txt file on Jun. 21, 2020.

BACKGROUND

Some conventional systems seek to reduce the severity of stuttering by playing back to a user an altered version of the user's voice, where the altered version is delayed or pitch-shifted relative to the user's actual voice. These conventional systems suffer from at least three problems. First, the conventional system may fail to recognize when the user is speaking, and may thus play back to the user an altered version of another person's voice, which is highly distracting. Second, the user may habituate to the altered version of the user's voice. As a result of this habituation, the acoustic feedback may cease to be effective—i.e., may cease to reduce the severity of the user's stuttering. Third, different users may respond differently to different feedback modes, causing a given feedback mode to be well-suited for only a subset of users.

SUMMARY

In illustrative implementations of this invention, a feedback system reduces a user's stuttering. To do so, the system may record the user's voice and play back to the user a transformed version of the user's voice. The latency in the playback may be so small that the user perceives the transformed version to be simultaneous with, or slightly delayed from, the user's actual voice. The transformed version of the user's voice may affect the user's neural processing in such a way as to reduce the severity of the user's stuttering.

In some cases, the feedback system operates in different feedback modes at different times. The feedback modes may include: (a) Whisper mode; (b) Reverb mode; (c) Harmony mode; (d) Retune mode; (e) Musical Accompaniment mode; (f) DJ mode; (g) Pop mode; (h) Bubble mode; (i) Delay mode; (j) Pitch-Shift mode; (k) Raw Voice mode; or (l) any combination of one or more of the foregoing. For instance, in some implementations, the system may operate in a set of feedback modes, which set includes at least Whisper, Reverb and Harmony modes. In some other implementations, the system may operate in a set of feedback modes, which set includes at least Whisper, Reverb, Harmony and Musical Accompaniment modes.

Each of the feedback modes may alter the user's voice in a different way. For example: In Whisper mode, the altered version of the user's voice (which is played back to the user) may sound as if it is being whispered in the user's ear. In Reverb mode, the altered version of the user's voice (which is played back to the user) may sound as if it is reverberating in a cavernous room. In Harmony mode, the feedback system may cause the user to hear the user's actual voice and simultaneously to hear one or more pitch-shifted versions of the user's voice. Thus, in Harmony mode, the altered voice may sound like a temporal series of musical chords.

The feedback system may generally operate in one feedback mode at a time. In some cases, during transitions between two feedback modes, the existing mode and the new mode briefly overlap while the existing mode fades out (decreases in amplitude) and the new mode fades in (increases in amplitude).

The feedback system may, from time to time, change parameters of a feedback mode or switch between different feedback modes. Changing modes or mode parameters is helpful, because it may prevent the user from habituating to feedback.

The feedback system may select a new feedback mode or new parameters of a mode, when the system detects that the severity of stuttering of the user is increasing. Or the feedback system may automatically switch modes or mode parameters after the expiration of a specified period of time. In either case, the selected mode or parameters may be optimized to most effectively reduce the user's stuttering at the time. Or the system may change mode or mode parameters in response to instructions inputted by a user. The user instructions may select a new mode or mode parameters.

The ability to change feedback modes and mode parameters is also helpful because which feedback modes and mode parameters are most efficacious in reducing stuttering may vary from individual to individual. The feedback system may analyze how the severity of stuttering by a particular user changes in response to different feedback modes and mode parameters, and may select a feedback mode and mode parameters that are best suited (or at least well-suited) for reducing the particular user's stuttering at the time.

In some implementations of this invention, the feedback system provides personalized and adaptive acoustic feedback, in order to reduce a user's stuttering. For instance, the feedback system may perform machine learning in order to learn to recognize vocal activity and to recognize when a particular user is speaking. After being trained, the feedback system may recognize when the user (as opposed to other person) is speaking and may thus avoid playing back to the user the voice of another person. Likewise, a machine learning algorithm may be trained to detect an increase in severity of the stuttering (which is indicative of habituation to a particular feedback mode) and to determine an optimal time to switch to another feedback mode. The trained machine learning algorithm system may detect when the user is becoming habituated to the current feedback mode and may output instructions to switch to a different feedback mode or to change parameters of the current feedback mode.

In some implementations, the hardware of the feedback system includes at least one microphone, at least one speaker, a digital signal processor (DSP) and one or more other computers (e.g., microprocessors or microcontrollers). In some cases, the entire system is housed in a device worn on or in a single ear of the user. In some cases, the entire system is housed in two devices worn on or in the two ears, respectively, of the user. In some other cases, some or all of the hardware components of the feedback system are housed in a smartphone, tablet computer or other mobile computing device. For instance, the DSP, microcontrollers, and microphone may be housed in a smartphone, and the speaker(s) may be worn in, on, or around the ear(s) (e.g., in an earpiece inserted into a user's ear canal, or in an earphone that faces the user's ear canal). In implementations in which some hardware components are housed separately from others, the hardware components may communicate wirelessly with each other (e.g., in accordance with a Bluetooth® communication protocol).

In some cases, the effect of the feedback system is transitory—that is, the system reduces stuttering that occurs while the system is providing feedback. Put differently, the feedback system may reduce contemporaneous stuttering by a user by playing back to the user, in real time, an altered version of the user's voice.

In some cases, the effect of the feedback is also long-term—that is, the system reduces stuttering by the user that occurs after the system provides feedback. Put differently, the feedback system may reduce stuttering by a user for a long period of time (e.g., minutes, hours, days, weeks, or months) after the system plays back to the user, in real time, an altered version of the user's voice.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 3 and FIG. 4 each show a flowchart for digital signal processing in a Reverb feedback mode. In FIG. 3, the processing includes a digital Schroeder reverberator. In FIG. 4, the processing includes a convolutional reverberator.

FIG. 5 shows a flowchart for digital signal processing in a Harmony feedback mode.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

In some implementations of this invention, an acoustic feedback system comprises one or more microphones, digital signal processors, microprocessors, one or more speakers, and one or more other I/O devices. The microphones may record a user's voice, and output an audio signal. The digital signal processor may transform the audio signal. How the audio signal is transformed at a given time may depend on the feedback mode in which the digital signal processor (DSP) is operating at the given time. The DSP may switch between different feedback modes (e.g., Whisper, Reverb, Harmony, Musical Accompaniment, Retune, DJ, Pop, Bubble, Raw Voice, Delay and Pitch-Shift). In some cases, the DSP operates in only a single feedback mode at any given time, except during transitions between modes. The speaker(s) may transform the audio signal into sound that is audible to the user.

The microphone(s) may comprise audio transducer(s) that convert sound into an electrical signal. For instance, each of the microphones may be a dynamic microphone (e.g., with a coil of wire suspended in a magnetic field), a condenser microphone (e.g., which employs a vibrating diaphragm as a capacitor plate), or a piezoelectric microphone. Each microphone may include a preamplifier.

The speaker(s) may be housed in any form factor, including in headphones (e.g., circum-aural or supra-aural headphones), earphones, earbuds or earpieces. For instance, the headphones or earphones may be configured to fit over or around a user's ears. Or, for instance, each earbud or earpiece may be configured to face, or fit at least partially into, a user's ear canal. Alternatively or in addition, bone conduction headphones may be employed.

The speaker(s) may comprise any type of audio transducer that converts electrical signals to sound signals. For instance, each speaker may employ one or more of the following technologies to output sound: (a) a moving coil driver (e.g., in which movement of a diaphragm is actuated by varying current in a coil of wire, where the coil of wire is attached to the diaphragm and is in a magnetic field created by a static magnet); (b) an electrostatic driver (e.g., an electrically charged diaphragm—such as a PET membrane—suspended between two electrodes); (c) an electret driver; (d) a planar magnetic driver; (e) a balanced armature sound transducer; (f) a Heil air motion transformer; (g) a piezoelectric film; (h) a ribbon planar magnetic driver; and (i) magnetostriction.

Figure 1A:
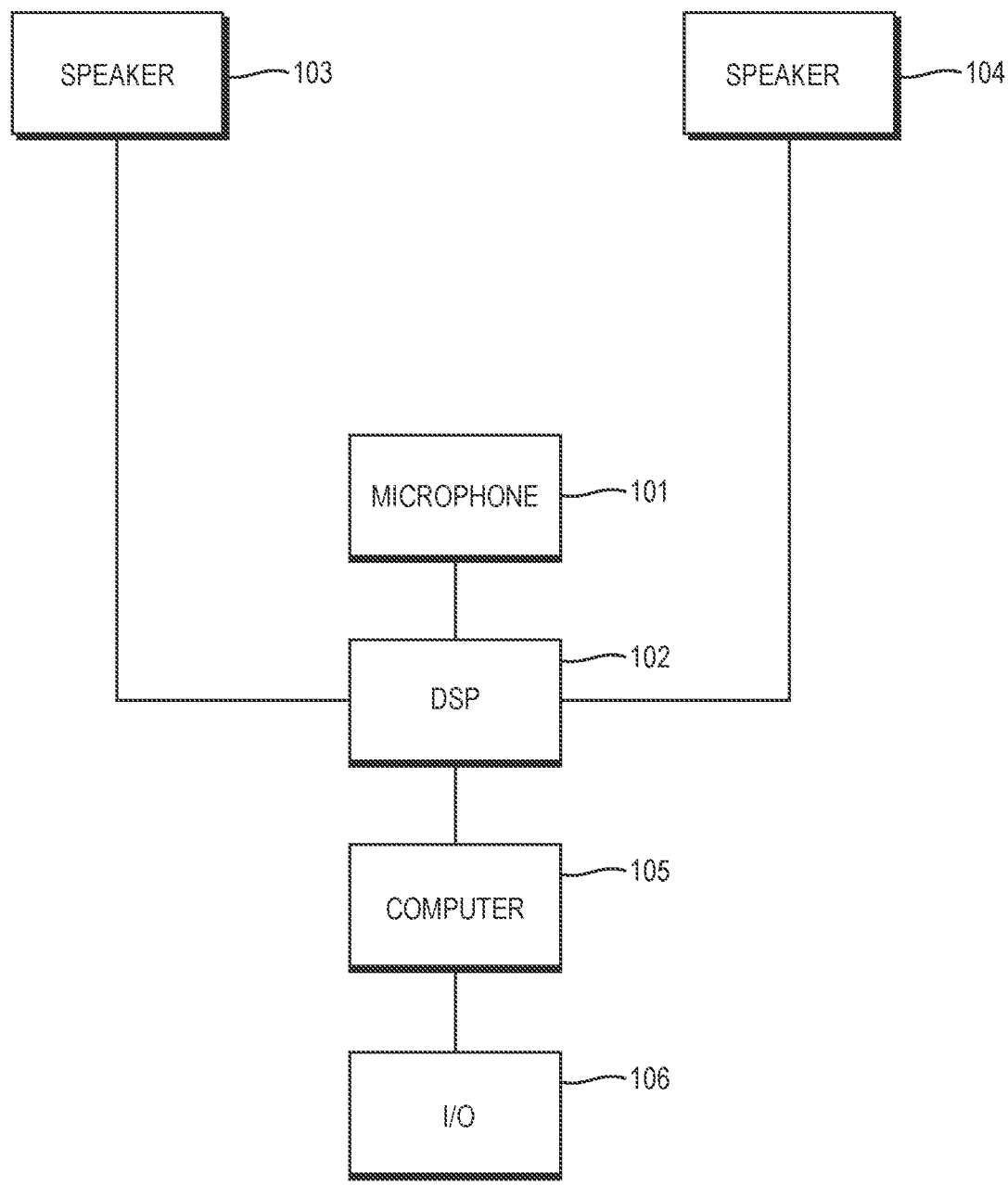
FIG. 1A shows hardware for a feedback system.

FIG. 1A shows hardware for a feedback system that plays back, to a user, a transformed version of the user's voice. In the example shown in FIG. 1A, the system includes a microphone 101, a digital signal processor 102, two speakers 103, 104, a computer 105, and one or more I/O devices 106. Microphone 101 may record a user's voice and output an electrical audio signal. Put differently, microphone 101 may convert the sound of a user's voice into an electrical audio signal. DSP 102 may transform the electrical audio signal to produce a transformed electrical audio signal. The transformation may be in accordance with a feedback mode. Speakers 103, 104 may each comprise or be housed in a headphone, earphone, earbud or earpiece. Speakers 103, 104 may convert the transformed altered audio signal (from the digital signal processor) into sounds audible to the user. These audible sounds may comprise a transformed version of the user's voice.

In FIG. 1A, the DSP 102 comprises one or more integrated circuits (e.g., microprocessor chips) that have architectures optimized for audio digital signal processing. DSP 102 may be housed, at least in part, in a digital audio mixer.

In FIG. 1A, one or more I/O devices 106 may accept input from a user, such as input that comprises instructions to control which feedback mode to use or to control volume of sound that is outputted by the speaker(s). The I/O device(s) may also display of otherwise provide (e.g., through a graphical user interface) information to a user regarding a status of the audible feedback (e.g., which feedback mode is being employed) and/or a measure of the user's fluency/disfluency (to let the user know how effectively the feedback system is reducing the user's stuttering). For instance, the I/O device(s) may comprise one or more touch screens, electronic display screens, buttons, dials, computer mice, and keyboards.

Figure 1B:
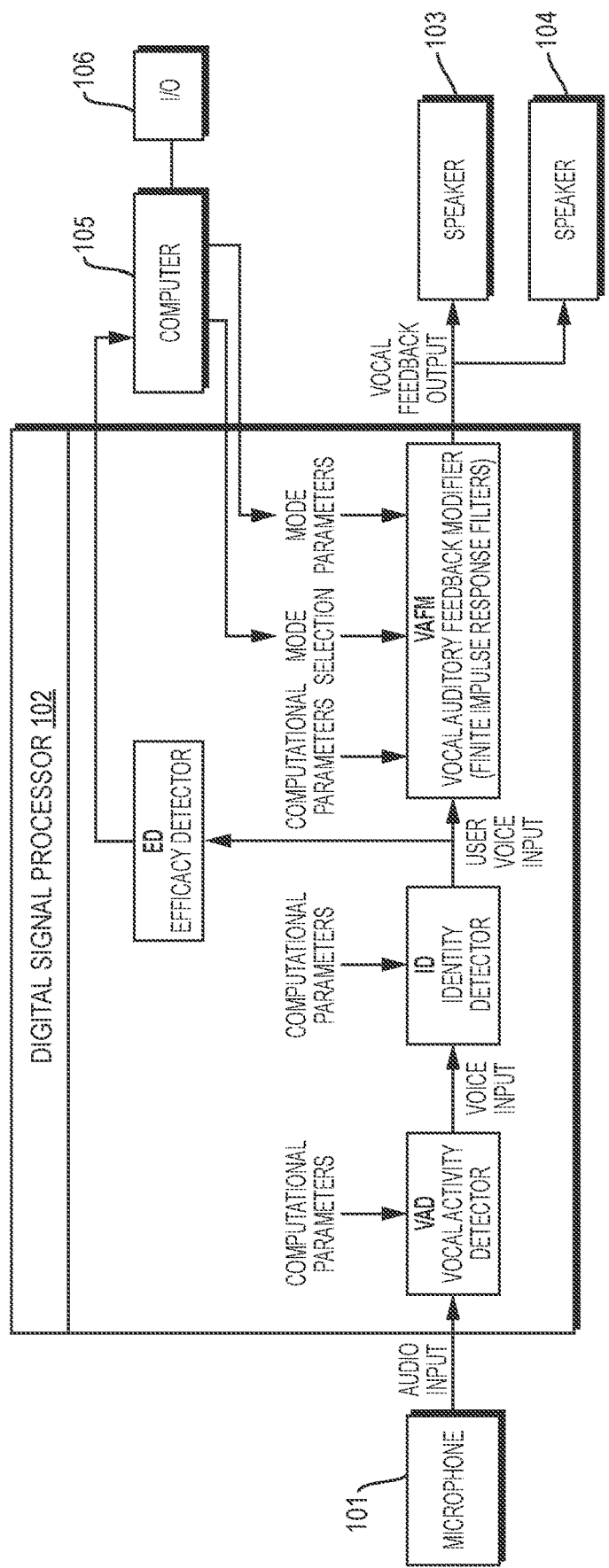
FIG. 1B shows a flowchart for digital signal processing and for audible feedback.

FIG. 1B shows digital signal processing and audible feedback, in an illustrative implementation of this invention. In FIG. 1B, microphone 101 records a user's voice. An audio signal from microphone 101 is fed into digital signal processor (DSP) 102. DSP 102 performs software that: (a) detects vocal activity (e.g., voices of one or more persons); (b) identifies when the user is speaking; (c) transforms the user's voice in accordance with a feedback mode; and (d) outputs a transformed audio signal that represents a transformed version of the user's voice. DSP 102 may employ one or more digital FIR (finite impulse response) filters when transforming the audio signal of the user's voice. Speakers 103, 104 convert the transformed audio signal into sound that is audible to the user. This audible sound may comprise an altered version of the user's voice.

In FIG. 1B, DSP 102 measures how efficacious the feedback is in reducing stuttering. To do so, DSP 102 may frequently measure the severity of the user's stuttering (e.g., by measuring the number of disfluencies per syllable). Less stuttering by the user may indicate that the audio feedback is reducing stuttering. Likewise, more stuttering by the user may indicate that the effectiveness of the audio feedback is declining as the user habituates to a particular sound.

In FIG. 1B, DSP 102 outputs data that is indicative of the user's current severity of stuttering. This data may be fed into a computer 105. In some cases, computer 105 comprises a microprocessor or microcontroller.

In FIG. 1B, computer 105 causes the feedback mode or parameters of the feedback mode to change when the earlier of three events occur. These three events are: (1) if severity of the user's stuttering increases sufficiently to indicate that the user is habituating to the current feedback mode; (2) if a specified amount elapses since the current feedback mode started; and (3) if the user inputs instructions to change the feedback mode.

In FIG. 1B, computer 105 outputs instructions that control when and how DSP 102 transforms an audio signal of the user's voice. These instructions may select which feedback mode to employ, and may specify how a selected feedback mode is performed. Put differently, these instructions may control which transformation occurs when DSP 102 transforms an audio signal of the user's voice.

In FIG. 1B, a user may input instructions via one or more I/O devices 106. For instance, these user instructions may instruct DSP 102 to switch to a selected feedback mode or to continue a selected feedback mode. Or, for instance, these user instructions may be commands to adjust volume of sound outputted by the speaker.

In some cases, the digital signal processor (e.g., 102) performs noise cancellation to cancel background noises in the audio data recorded by the microphone(s).

In some cases, the digital signal processor (e.g., 102) performs an audio source separation algorithm to extract the user's voice from sounds (e.g., one or more voices and noise) recorded by the microphone(s).

Feedback Modes, Generally

In each feedback mode, the sound being played back to the user may tend to reduce the user's stuttering. For instance, the sound that is played back to the user may cause the number of stuttering disfluencies per syllable spoken by the user to decrease. The stuttering disfluencies may comprise involuntary repetitions, blockages, and prolongations of sound during speaking.

Whisper Mode

In Whisper mode, the system may play back, to the user, a whispered version of the user's own speech. This whispered version may sound, to the user, as if the user is whispering in his or her own ear.

In some cases, the system produces Whisper effect by: (a) applying a Fourier transform to the incoming time-domain audio signal of the user's voice; (b) stochastically modifying the phase of each FFT bin in the frequency domain, by replacing an original phase with a randomly generated number within the unit circle; and (c) then applying an inverse Fourier transform to the phase-altered frequency domain representation of the user's voice. In some cases, the magnitude of the signal is not altered in the process described in the preceding sentence.

Alternatively, in some cases, the altered sound in Whisper mode is generated by convolving a raw (unaltered) audio signal of the user's voice with filtered pink noise. This filtered pink noise may be generated by digitally filtering pink noise in such a way as to cause the spectral distribution of the audio signal (after filtering) to match the spectral distribution of an audio recording of a single person (e.g., the user or another person) whispering. Alternatively, the filtered pink noise may be generated by digitally filtering pink noise in such a way as to cause the spectral distribution of the audio signal (after filtering) to match an average spectral distribution of audio recordings of whispering by multiple persons. For instance, the multiple persons may be multiple adult men and multiple adult women, and the audio recordings may be of the respective persons whispering, one person in each recording.

Figure 2:
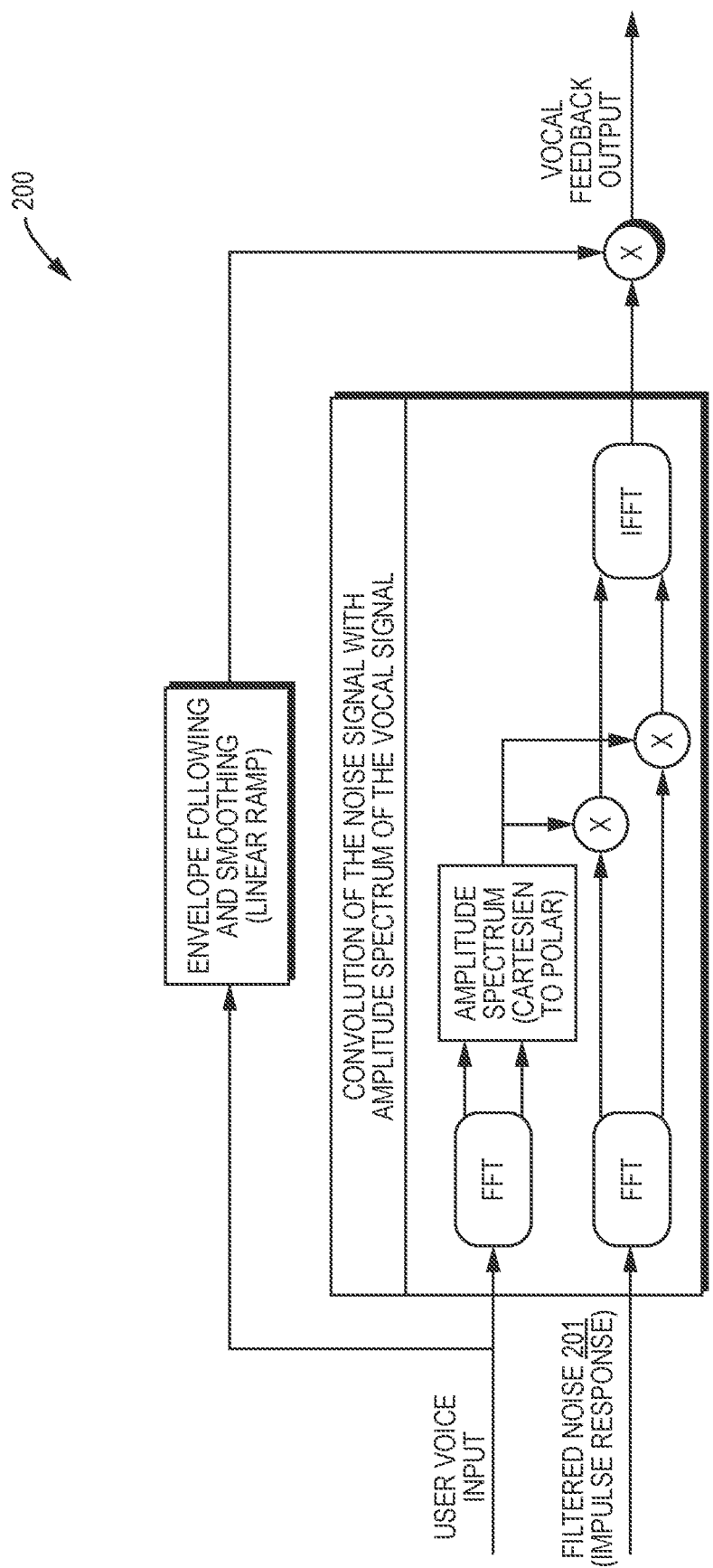
FIG. 2 shows a flowchart for digital signal processing in a Whisper feedback mode.

FIG. 2 shows a flowchart for digital signal processing 200 in a Whisper feedback mode. In FIG. 2, the filtered noise 201 is filtered pink noise, which has a spectral distribution that matches an average spectral distribution of persons whispering.

Reverb Mode

In Reverb mode, the system may play back a reverberating version of the user's own speech. This reverberating version may sound, to the user, as if the user is speaking in a cavernous room and hearing reverberations (from the room) of the user's speech. In some cases, the reverberation sound effect in Reverb mode is generated digitally by: (a) a Schroeder reverberator (e.g., comprising multiple comb filters and multiple all-pass filters); (b) a convolutional reverberator; or (c) an algorithmic reverberator (e.g., in which one or more feedback delay circuits create a decaying series of echoes).

Figure 3:
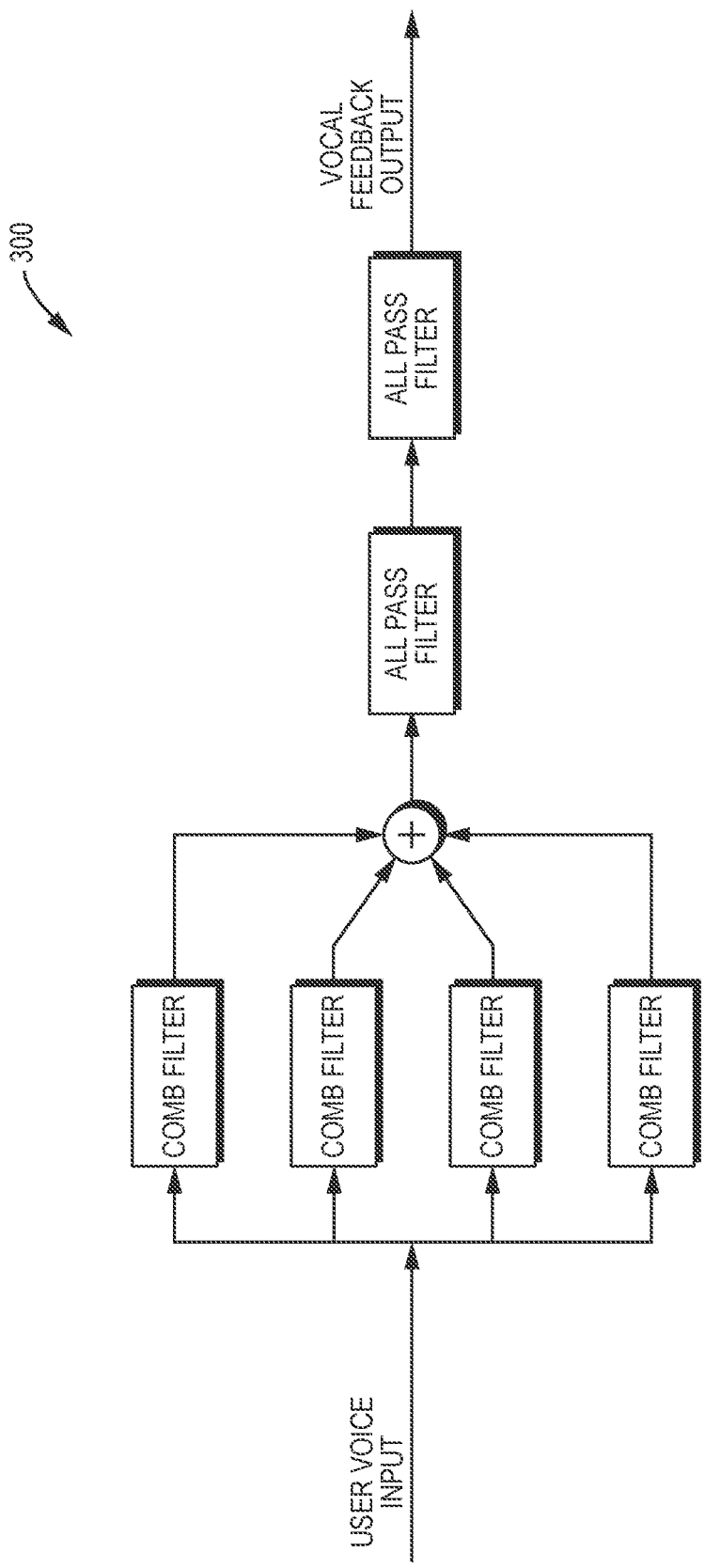

FIG. 3 and FIG. 4 each show a flowchart for digital signal processing in a Reverb feedback mode. In FIG. 3, the processing includes a digital Schroeder reverberator 300, which includes four different digital comb filters and two different digital all-pass filters. In FIG. 4, the processing includes a convolutional reverberator 400.

Harmony Mode

In Harmony mode, the system may play back, to the user, a harmonized version of the user's own speech. The harmonized version may comprise multiple audio streams of the user's voice that are frequency-shifted relative to each other and that are played back simultaneously with each other. In what we sometimes call an "active" version of Harmony mode, the multiple audio streams may comprise (a) the user's raw voice signal and (b) one or more pitch-shifted audio streams of the user's voice that are shifted in frequency relative to the fundamental frequency of the user's voice (each pitch-shifted stream being shifted in frequency by a different amount). In what we sometimes call a "passive" version of Harmony mode, the multiple audio streams may comprise two or more pitch-shifted audio streams of the user's voice, which form a musical chord that remains constant throughout an entire "passive" period and that is independent of the fundamental frequency of the user's voice. In Harmony mode, the frequency increments between the different audio streams of the user's voice (which are played back to the user simultaneously with each other): (a) may be the same as between notes in a musical chord in a musical scale (e.g., diatonic or chromatic musical scale); or (b) may be the same as between notes in a major chord (e.g., a triad major chord) or a minor chord (e.g., a triad minor chord). As a non-limiting example, the harmonized version of the user's voice (in Harmony mode) may comprise: (a) a raw audio stream of the user's voice, which has not been shifted in frequency; (b) a first pitch-shifted stream of the user's voice, which has a frequency that is a major third—or a minor third—above the fundamental frequency of the user's voice; and (c) a second pitch-shifted stream of the user's voice, which has a frequency that is a perfect fifth above the fundamental frequency of the user's voice.

In Harmony mode, the harmonized version may sound, to the user, as if the user is speaking and is simultaneously musically harmonizing with his or her own voice. Put differently, in Harmony mode, a user may hear the harmonized version as a musical chord of the user's voice. The root note of this chord may be the fundamental frequency of the user's voice.

In Harmony mode, the number of audio streams that are combined into a musical chord may be two, three, four or more.

In Harmony mode, the user may input parameters that select pitch-shifting for an individual note or for an entire chord. For instance, in Harmony mode, a user may select from a predefined set of musical chords, in order to specify pitch-shifts. Likewise, a computer may analyze the user's voice and select an optimal frequency shift for an individual note in the chord or for the entire chord.

FIG. 5 shows a flowchart for digital signal processing in a Harmony feedback mode. In FIG. 5, multiple audio streams of the user's voice are pitch-shifted and then combined (e.g., superimposed). As a non-limiting example: (a) a first audio stream of the user's voice may undergo a first pitch shift 510 of zero (preserving the frequency of the user's actual voice); (b) a second audio stream of the user's voice may undergo a second pitch shift 511, relative to the fundamental frequency of the user's voice, of a major third or minor third; (c) a third audio stream of the user's voice may undergo a third pitch shift 512, relative to the fundamental frequency of the user's voice, of a perfect fifth. In FIG. 5, the output 501 is an audio signal that, when converted to audible sound, sounds like the user is speaking in musical chords (e.g., speaking in multiple notes at the same time). Put differently, the audible sound sounds as if the user is harmonizing with himself or herself.

Musical Accompaniment Mode

In Musical Accompaniment mode, the system may play back, to the user, the user's own speech accompanied by notes that match the fundamental frequency of the user's voice and that are recordings of (or are synthesized to that digitally imitate the sound of) an acoustic musical instrument. For example, at each speech attack (build-up in volume) of the user's speech, the raw signal of the user's voice may be accompanied by the sound of a musical instrument playing a note that has the same fundamental frequency as the current fundamental frequency of the user's voice. For instance, the musical instrument may be any string instrument (e.g., guitar, piano, or violin) or any wind instrument (e.g., brass or woodwind).

In Musical Accompaniment mode, the audible feedback may sound, to the user, as if the user is speaking accompanied by a musical instrument. Put differently, in Musical Accompaniment mode, the audible feedback may sound, to the user, as if a musical instrument is playing the same temporal series of notes as the temporal series of notes of the speaker's voice.

Alternatively, in Musical Accompaniment mode, the system may play back, to the user, the user's own speech accompanied by chords of notes that are recordings of (or are synthesized to that digitally imitate the sound of) an acoustic musical instrument. For example, at each speech attack (build-up in volume) of the user's speech, the raw signal of the user's voice may be accompanied by the sound of a musical instrument playing a musical chord that includes a note that has the same fundamental frequency as the current fundamental frequency of the user's voice. In this alternative approach, in Musical Accompaniment mode, the audible feedback may sound, to the user, as if a musical instrument is playing a temporal series of chords, where each chord includes a note which has the same fundamental frequency as the fundamental frequency of the user's voice.

Retune Mode

In Retune mode, the system may play back, to the user, a retuned version of the user's own speech. This retuned version may be frequency-shifted in such a way that the fundamental frequency of the retuned version is equal to the note on the C major musical scale that is closest to the fundamental frequency of the user's voice. This retuned version may sound, to the user, more musical than the user's own voice.

DJ Mode

In DJ mode, the system may play back, to the user, a version of the user's speech that has been altered to sound deep and guttural (relative to the user's actual speech) with background noise.

Pop Mode

In Pop mode, the system: (a) may play back, to the user, a harmonized version of the user's voice; and (b) may change a musical chord of the harmonized version at each pseudobeat of the user's voice. In Pop mode, the altered version of the user's voice may sound uplifting and jocular.

The transformation of the user's voice in Pop mode is similar to that in Harmony mode, in some respects. In Pop mode, the harmonized version may comprise multiple audio streams of the user's voice that are frequency-shifted relative to each other and that are played back simultaneously with each other. For instance, in Pop mode, the frequency increments between the different audio streams of the user's voice (which are played back to the user simultaneously with each other): (a) may be the same as between notes in a musical chord in a musical scale (e.g., a diatonic or chromatic musical scale); or (b) may be the same as between notes in a major chord (e.g., a triad major chord) or a minor chord (e.g., a triad minor chord).

However, the transformation of the user's voice in Pop mode differs from that in Harmony mode, in some respects.

In Pop mode, the first audio stream of the user's voice may be pitch-shifted to the nearest note in a musical scale (e.g., to the nearest note in a major scale, such as a C major scale). The other audio stream(s) may be pitch-shifted to other notes in the same musical scale. As a non-limiting example, the harmonized version of the user's voice in Pop mode may comprise (a) a first audio stream of the user's voice, which has been shifted in frequency to match a note in a musical scale, which note is the nearest in that musical scale to the fundamental frequency of the user's voice; (b) a second audio stream of the user's voice, which has a frequency that is a major third above the fundamental frequency of the first audio stream; and (c) a third audio stream of the user's voice, which has a frequency that is a perfect fifth above the fundamental frequency of the first audio stream. As another non-limiting example, the harmonized version of the user's voice in Pop mode may comprise (a) a first audio stream of the user's voice, which has been shifted in frequency to match a note in a musical scale, which note is the nearest in that musical scale to the fundamental frequency of the user's voice; (b) a second audio stream of the user's voice, which has a frequency that is a minor third above the fundamental frequency of the first audio stream; and (c) a third audio stream of the user's voice, which has a frequency that is a perfect fifth above the fundamental frequency of the first audio stream.

In Pop mode, the pitch for each of the audio streams of the user's voice may remain constant between pseudo-beats. Put differently, throughout the interval between a pseudo-beat and the next pseudo-beat, the feedback system may, in Pop mode, continue to play back the same musical chord of the user's voice. At each pseudobeat, this chord may change if the fundamental frequency of the user's voice changes. For instance, at each pseudobeat, the system: (a) may calculate a new fundamental frequency of the user's voice; (b) may cause a first audio stream of the user's voice to be shifted in frequency to match a note in a musical scale, which note is the nearest in that musical scale to the new fundamental frequency of the user's voice; and (c) may cause the other audio streams to be shifted in frequency relative to the first audio stream by the same frequency intervals (e.g., major or minor third and perfect fifth) as used for the prior pseudo-beat. In Pop mode, these harmonic shifts may follow musical harmonic rules about chord change expectations and resolutions.

In Pop mode, each pseudobeat may occur during a speech attack of the user's voice, which speech attack is a build-up in amplitude of the user's voice. For instance, each pseudo-beat may occur at a speech attack that (a) is at least a specified period of time after the previous pseudobeat, and (b) builds up to a peak of amplitude that is above a specified threshold. Depending on the particular implementation of Pop mode, pseudo-beats may be calculated as occurring: (a) at the start of a build-up in amplitude of the user's voice; (b) at a specified amount of time after the start of the build-up; or (c) or at the end of the build-up.

Bubble Mode

In Bubble mode, the system may play back, to the user, a version of the user's voice that has been transformed to sound as if being heard underwater through bubbles. In some cases, the feedback system in Bubble mode transforms an audio signal of the user's voice by: (a) continuously measuring the fundamental frequency of the user's voice; (b) smoothing the pitch contour, and (c) generating a sinusoidal signal at a frequency following the smoothed pitch signal.

Raw Voice Mode

In Raw Voice mode, the system plays back the user's voice with no modification other than a minimal delay (e.g., less than 10 ms) and audio artifacts (e.g., clipping and noise) due to a non-ideal audio system. In Raw Voice mode, the user may perceive the played back version of her of his voice as slightly different than how the user hears it during everyday conversation. For instance, a user may perceive the played-back voice in Raw Voice mode as similar to hearing herself or himself in a home video (audiovisual recording).

Delay Mode

In Delay mode, the system may play back a delayed version of the user's speech. For instance, the delay may be in the range of 50 or 200 milliseconds. This delayed version may sound, to the user, as if the user's voice is echoing from a single surface (rather than reverberating—that is, rather than reflecting from many different surfaces at different distances from the user). In Delay mode, the formants and voice qualities of the user's actual voice may be preserved. The Delay mode is sometimes called delayed auditory feedback or DAF.

Pitch-Shift Mode

In Pitch Shift mode, the system may play back, to the user, a version of the user's speech that has been pitch-shifted. The Pitch-Shift mode is sometimes called frequency-shifted auditory feedback or FAF.

More Details on Feedback Modes

In all of the feedback modes (even Raw Voice mode), the user may perceive the sound that is played back to the user as sounding different from how the user perceives his or her own voice during ordinary conversation. This may be at least partially due to the fact that the user normally hears her or his voice after it has been conducted through bone and other tissue from the user's throat and mouth to the user's ear, whereas the sound that is played back to the use travels by a different route. This may also be due to other artifacts (e.g., clipping and noise) caused by non-ideal electronic components of the feedback system. The fact that the sound that is played back to the user is different may be desirable, because the strangeness of the sound may tend to alter the user's neural processing in a way that reduces stuttering.

In many cases, it is preferable to minimize the latency of the system—that is, the delay between when the user speaks a sound and when an altered version of the sound is replayed to the user—in many feedback modes. This is because perceptible delay in the feedback may be distracting to the user.

In some cases, the delay in all or some of the feedback modes is so small that the user does not perceive a delay, or perceives only a very short delay. For instance, the latency of the system in one or more feedback modes (e.g., one or more of the Whisper, Reverb, Harmony, Musical Accompaniment, Retune, DJ, Pop, Bubble, Raw Voice, and Pitch-Shift modes) may—at least in some implementations—be less than 30 ms, or less than 25 ms, or less than 20 ms, or less than 15 ms, or less than 12 ms, or less than 10 ms, or less than 8 ms, or less than 6 ms, or less than 5 ms, or less than 4 ms.

However, in some cases, the delay in at least one feedback mode (e.g., Delay mode) is greater than or equal to 50 ms (e.g., in a range of 50-200 ms). A relatively large delay in Delay mode (e.g., in the range of 50 ms to 200 ms) may be distracting, but may reduce stuttering.

In some feedback modes, the system may frequently sample the user's voice to determine the fundamental frequency of the user's at different points of time. For instance: (a) a microphone may record sound of a user's voice during a period of time; and (b) one or more computers (e.g., a digital signal processor and/or other computers) may calculate fundamental frequency of the recorded sound for each of multiple temporal windows in the period of time. The fundamental frequency at a given point in time may be calculated on a trailing basis, based on measurements taken during the most recent temporal window measured by that point in time. A pitch detection algorithm (PDA) may be employed to determine the fundamental frequency of the user's voice in each of the temporal windows. For instance, the PDA may be a Yin algorithm, AMDF (average magnitude difference function) algorithm, ASMDF (average squared mean difference function) algorithm, MPM algorithm, or other algorithm that calculates autocorrelation to detect pitch.

In some feedback modes, the system shifts the fundamental frequency of an audio stream of the user's voice to a musical note in a musical scale, which note is the nearest to the fundamental frequency of the user's voice. In some cases, the system: (a) rounds off to the nearest note—i.e., rounds to the note for which the absolute value of the difference in frequency (between the note and the estimated fundamental frequency of the user's voice) is least, with a rule for ties; (b) rounds up to a note; or (c) rounds down to a note.

In many cases, one or more pitch-shifted versions of the user's voice change fundamental frequency repeatedly as the fundamental frequency of the user's actual voice changes frequency. For instance, in Harmony, Pop, Retune and Pitch-Shift modes, each particular pitch-shifted version of the user's voice may repeatedly change pitch in order to maintain a constant frequency interval between the fundamental frequency of the particular pitch-shifted version and the fundamental frequency of the user's voice. Likewise, in Musical Accompaniment mode, the musical accompaniment notes may repeatedly change pitch in order to remain at the same pitch as the changing fundamental frequency of the user's voice.

Transitions Between Feedback Modes

As noted above, the feedback system may switch between feedback modes or may change parameters of a feedback mode, to prevent the user from habituating to the feedback. This is desirable, because habituation may reduce the efficacy of the feedback.

For instance, in some cases, a computer causes the feedback mode (or one or more parameters of a feedback mode) to change when any of the following events occur: (a) severity of the user's stuttering increases (indicating that the user is habituating to the current feedback mode); (b) a specified amount elapses since the current feedback mode started; and (c) the user inputs instructions to change the feedback mode. The mode parameter(s) that are changed may include one or more of: (a) gain; (b) buffer size; (c) sample rate; (d) panning; (e) room size (e.g., in Reverb mode); (f) decay time (e.g., in Reverb mode); (g) damping (e.g., in Reverb mode); (h) diffusion (e.g., in Reverb mode); (i) mix ratio between raw signal and filtered signal (e.g., in Whisper mode or Harmony mode); (j) shape and cutoff frequency of filter (e.g., shape and cutoff frequency of pink noise filter in Whisper mode); (k) characteristics of phase transformation, such as random or semi-random phase transformation (e.g., in Whisper mode); (l) musical chord (e.g., in Harmony and Pop modes and, in some cases, Musical Accompaniment mode); and (m) active/passive (e.g., in Harmony mode).

In some cases, the system transitions between feedback modes with an audible "fade out" (gradual decline in amplitude) of the existing mode and audible "fade in" (gradual increase in amplitude) of the new mode. In some cases, during this fade in and fade out, the two modes briefly overlap each other audibly. In some cases, during transitions between feedback modes, there is a silent pause in the feedback. Likewise, when changing parameters of a given feedback mode, feedback with existing parameters may "fade out" while feedback with new parameters "fades in".

In some implementations of this invention, a machine learning algorithm is trained to detect when a user is habituating to the current feedback mode. The machine learning model may be trained for this task on a training dataset that comprises samples, where each sample is a temporal window of recorded speech or is a word or other unit of recorded speech. These samples may include instances of normal speech (in which no stuttering disfluencies occur) and instances of different kinds of stuttering disfluencies. For instance, the different kinds of stuttering disfluencies may include: (a) repetitions of words or parts of words (e.g., "wh-wh-which"); (b) prolongations of words or parts of words (e.g., "baaaat"); (c) blockages in speech (e.g., pauses of more than a specified threshold between words or parts of words); and (d) tempo of speech after disregarding repetitions. The samples in the training set may be labeled as stuttering/not stuttering, or may be labeled with a metric of severity of stuttering. In some cases, samples in the training dataset include phonemes that are automatically labeled by software that employs a pre-trained normal speech model and performs timing calculations. In some cases, samples in the training dataset include phonemes that are automatically labeled by software that calls on, or includes code from: (a) the Kaldi speech recognition toolkit; or (b) or HTK (Hidden Markov Model Toolkit). Alternatively or in addition, unsupervised learning may be performed in which the model is trained on unlabeled samples.

After being trained, the machine learning model may take an audio stream of the user's voice as an input and may detect when the user is habituating to the current feedback mode (the habituation being indicated by an increase in severity of stuttering). When the trained machine learning model detects habituation, it may notify a microcontroller. The microcontroller may, in turn, select a new feedback mode (i.e., a mode different than the current feedback mode) and instruct the DSP to cease operating in the current feedback mode and to switch instead to the new mode. Or the microcontroller may select new values for parameters for the current feedback mode and may instruct the DSP to cease operating with the existing values for the parameters and to switch instead to the new values for the parameters.

In some cases, features of the user's voice are extracted from a live audio stream of the user's voice. The extracted speech features may include, among other things: (a) repetitions of words or parts of words (e.g., "wh-wh-which"); (b) prolongations of words or parts of words (e.g., "baaaat"); (c) blockages in speech (e.g., pauses of more than a specified threshold between words or parts of words); (d) tempo of speech after disregarding repetitions; and (e) excessive effort in speaking (while the user is trying to pronounce a word or part of a word). As non-limiting examples, the prolongations that are extracted may be pauses of more than 250 ms, or more than 500 ms. In some cases, the extracted speech features include an amount of increase (or decrease) in a rate of a particular stuttering disfluency or of overall stuttering disfluencies, relative to a sample taken earlier in the current feedback mode. In some cases, the extracted speech features include an amount of increase (or decrease) in a rate of a particular stuttering disfluency or of overall stuttering disfluencies, relative to a baseline sample taken before the current feedback mode. For instance, the baseline may have been measured in a previous feedback mode or in a time period in which the system is not providing acoustic feedback. In some cases, the extracted speech features include one or more of: acceleration, deceleration, variance, or other statistical measures of a particular stuttering disfluency or of overall stuttering disfluencies. In some cases, excessive effort in speaking may be measured by a microphone and/or other sensors.

The extracted features may be fed as input to the machine learning model, during training of the model and during operation of the trained model. In some cases, a dimensionality reduction algorithm (e.g., principal component analysis) is performed, to reduce the dimensionality of the feature set, before feeding outputs (e.g., principal components) of the reduced dimensionality algorithm into the machine learning model.

As noted above, a trained machine learning model may detect when a user habituates to a current feedback mode (or, equivalently, may determine when to switch to a different feedback mode). In some implementations, the machine learning model that performs this task is a reinforcement learning algorithm (such as a Monte Carlo, Q-learning, state-action-reward-state-action, or deep Q network algorithm) or a supervised learning algorithm, such as a decision tree algorithm, random forests algorithm, ANN (artificial neural network), CNN (convolutional neural network), RNN (recurrent neural network), RNN with LSTM (long short term memory), RNN with Gated Recurrent Unit, MLP (multi-layered perceptron), or SVM (support vector machine) algorithm or a classifier such as a KNN (k-nearest neighbors) or naive Bayes algorithm. In some cases, the machine learning model is an unsupervised learning algorithm, such as AE (auto-encoder), SAE (stacked auto-encoder) VAE (variational auto-encoder), DBN (deep belief network), GAN (generative adversarial network), conditional GAN, or infoGAN algorithm. Or, for instance, the machine learning model may comprise a restricted Boltzmann machine.

Alternatively, in some cases, a computer performs calculations to detect habituation, which calculations take extracted speech features as an input and do not themselves involve machine learning (unlike extracting speech features, which may involve machine learning). Here is a non-limiting example of such calculations: A computer may determine that the user is habituating to the current feedback mode when any trigger in a set of triggers occurs. The set of triggers may include one or more of: (a) an increase in a rate of overall stuttering disfluencies relative to that in a time window earlier in the current feedback mode, which increase exceeds a specified threshold; (b) an increase in rate of a particular type of stuttering disfluency relative to that in a time window earlier in the current feedback mode, which increase exceeds a specified threshold; (c) an increase in a rate of overall stuttering disfluencies relative to that in a baseline time window, which increase exceeds a specified threshold; and (d) an increase in rate of a particular type of stuttering disfluency relative to that in a baseline time window, which increase exceeds a specified threshold. The baseline time window referred to in the preceding sentence may have occurred: (a) in a previous feedback mode; or (b) in a time period in which the system is not providing acoustic feedback. In some cases, a combination of increases of rates for multiple types of stuttering disfluencies, which increases exceed respective thresholds, is a trigger in the set of triggers. The increases of rates for multiple types of stuttering disfluencies may be relative to: (a) a time window earlier in the current feedback mode; (b) a time window in a previous feedback mode; or (c) a time window in which the system is not providing acoustic feedback.

Speaker Identification

In illustrative implementations of this invention, a speaker identification algorithm is trained to recognize when a particular speaker (who is using the feedback device) is speaking. This may enable the feedback system to provide feedback to the user only when the user is speaking, and to thereby avoid playing back to the user an altered version of another person's voice.

The speaker identification algorithm may extract and analyze both low-level (e.g., 10-20 ms) features of speech (e.g., pitch) and high-level features of speech (e.g., length of pauses between words). The set of features that are extracted and analyzed for speaker identification may be broader than, or may only partially overlap with, the set of features that are extracted for purposes of detecting habituation. The features may be extracted from a live stream of the user's voice.

In some cases, the speaker identification algorithm models a voice (or features of a voice) using a GMM (Gaussian Mixture Model), a GMM-UBM (Gaussian Mixture Model-Universal Background Model), a MAP-adapted GMM (maximum a prior-adapted GMM), a neural network, or an HMM (Hidden Markov Model). In some cases, the speaker identification algorithm identifies a speaker using a nearest neighbor algorithm. In some cases, the speaker identification algorithm employs an SVM (Support Vector Machine). The SVM may minimize error by altering decision boundaries. In some cases, the speaker identification algorithm employs score normalization. The score normalization may reduce error by moving speaker model score vectors away from decision boundaries. In some cases, the speaker identification algorithm employs joint factor analysis, principal component analysis, linear discriminant analysis, latent factor analysis, dynamic time warping, or statistical techniques for classifying stochastic data.

Speech Recognition

In illustrative implementations of this invention, a speech recognition algorithm extracts speech features from an audio stream of a user's voice. In some cases, the speech recognition algorithm employs, or includes code from, a Kaldi speech recognition toolkit or an HTK (Hidden Markov Model Toolkit). In some cases, the speech recognition algorithm employs one or more of the techniques and algorithms described above in the Speaker Identification section, in order to recognize stuttering disfluencies, words or other units of speech.

The speech recognition algorithm may be speaker-independent. Alternatively, the speech recognition algorithm may have been trained, at least in part, on samples of a particular user's speech and may be best suited for recognizing speech of the particular user.

Prototype

The following 13 paragraphs describe a prototype of this invention.

In this prototype, a user is fitted with a microphone and a pair of in-ear headphones. The microphone is a Countryman™ E6 Directional Earset, placed on the left side at about 1.5 cm from the corner of the subject's mouth. If the subject has a beard, the microphone is shaped to not be in direct contact with the skin, so as to avoid crackling sounds from friction.

In this prototype, the microphone output is fed to an audio mixer (RME Babyface®) and routed to a Mac mini Processor® using Max MSP™ and Reaper™ 64 audio software before being returned to the subject's ears through a pair of Bose® SoundSport® headphones to provide audio feedback. The SoundSport® headphones are very open (i.e., easily allow external sound to transmit through the headphones).

Raw Voice: In this prototype, the Raw Voice mode takes a user's voice and plays it back to him or her with minimal modification and latency. The delay is kept under 6 ms (buffer size (=256)/sample rate (=44100)=0.0058).

Whisper: In this prototype, the transformation of the audio signal during Whisper feedback mode involves filter convolution, in which the Raw Voice signal is convolved with pink noise that is filtered with a low pass filter obtained using the averaged spectral distribution of whispered voice recordings of men and women. In this prototype, in Whisper mode: (a) the feedback respects the consonants but imposes pink noise timbre on vowels and "voices" sounds; (b) the balance threshold for convolution is chosen for a peak amplitude 10 times higher than the previous 40 samples; (c) the feedback creates an effect of a breathy voice and slightly muffled sound, akin to someone whispering close to one's ear; (d) vocal aspects such as envelope, consonants, and rhythm are respected; (e) vocal qualities are transformed into an extreme form of breathiness; and (f) vowels are not voiced.

Reverb: In this prototype, the Reverb mode is digitally modeled as a plate reverb in the style of Griesinger using Max MSP™. In this prototype, in Reverb mode: (a) the feedback emulates reverberations that would occur in a medium room size with average decay time, high-frequency damping, and a high diffusion rate; and (b) the voice fundamental frequency, other formants, quality, envelope, and other vocal qualities are preserved.

Harmony: In this prototype, the Harmony mode is obtained by layering three pitch-shifted versions of the original vocal signal on top of the Raw Voice in Max MSP. In this prototype, in Harmony mode: (a) the feedback creates a chorus effect, as if several people were following the speaker's voice in a harmonized fashion; and (b) the feedback combines the effect of pitch shifting and choir speech by blending an original version of the voice (that respects all of the original vocal parameters) with additional versions where fundamental frequency and the formats are transformed but the other parameters remain the same.

Musical Accompaniment: In this prototype, the Musical Accompaniment mode is implemented as a succession of synthesized piano keystrokes matching a subject's voice frequencies and amplitude. In this prototype, in Musical Accompaniment mode: (a) each speech attack higher than a threshold triggers a MIDI note sent by Max MSP to Reaper; (b) the note's pitch and amplitude are chosen using the amplitude and fundamental frequency of the voice measured using the yin algorithm; (c) the system measures the voice's pitch 10 ms after each attack and plays the closest MIDI note on the C major scale; (d) the system creates a succession of synthesized piano notes synchronized and in pitch-harmony with the user's voice; and (e) the acoustic feedback accentuates the rhythm of speech and sounds like a piano being played along to the ebb and flow of the user's voice.

Retune: In this prototype, the Retune mode is achieved by matching the subject's fundamental frequency to the nearest note on the C major scale. In this prototype, in Retune mode: (a) MAX MSP™ software is employed; (b) a Yin algorithm and a windowed pitch shifter are employed; and (c) the transformation of the sound is more easily perceptible during pitch swipe as the user may hear his or her voice quantized into semitonal steps.

DJ: In this prototype, the DJ mode involves a mixture of vocal transformation and sound effects. In this prototype, in the DJ mode: (a) the raw signal is processed using the Reaper™ plugin VocalSynth2, with Distortion, Delay, Filter, and Chorus attributes and Biovox and Polyvox vocal modifiers, in addition to vocal key-correction; and (b) feedback has a guttural, deep sound, with background noise.

Pop: In this prototype, the Pop mode is implemented by detecting the pitch of the voice at each pseudo-beat using a Yin algorithm, mapping the incoming vocal signal to the closest note on the C major scale, and then shifting the forthcoming speech to harmonize with that note, until the next pseudo-beat a few seconds later. In this prototype, in Pop mode: (a) a Reaper™ Plugin MHarmonizerMB is employed to transform the voice; and (b) the transformed version of the user's voice that is played back to the user (i) sounds uplifting and jocular, (ii) preserves fundamental frequency, formants, amplitude, quality, and room amplitude of a stream of the user's voice, (iii) adds layers of harmony with modified fundamental frequency and formants, and (iv) employs pseudo-beats that highlight the natural rhythm of the voice.

Bubble: In this prototype, the Bubble mode is implemented as follows: (a) the raw vocal signal is processed by Max MSP™ audio software to extract, in real time, a continuous pitch contour of the spoken voice using the Yin algorithm; (b) the pitch contour is smoothed and used to control a sinusoidal oscillator generating a periodic waveform at the voice pitch; and (c) the smoothing generates an envelope around the sound attacks creating a perceived delay of 70 ms. In this prototype, in Bubble mode: (a) the feedback sounds akin to a sinusoidal oscillator following the pitch and amplitude of the voice; (b) the user may perceive the feedback as "bubbly" or having an "underwater" feeling, as if the voice were muffled; and (c) the feedback respects fundamental frequency and amplitude of the user's voice but not the other formants, as it heavily filters the signal into a pure sine tone.

Delay: In this prototype, the Delay mode adds a 100 ms latency to the Raw Voice. Thus, in this prototype, the Delay mode creates a sound akin to an echo of one's own voice, or a delay on the phone or video-call conversation.

Pitch-Shift: In this prototype, the Pitch-Shift mode is implemented using the Reaper™ plugin ReaPitch FX. In this prototype, in Pitch-Shift mode: (a) a Simple Windowed Fast variant algorithm (20 ms window, 10 ms fade) is performed, with a −2 semitone shift applied; and (b) the Pitch-Shift algorithm shifts all frequencies equally and does not respect formants.

Tests of this prototype found that: (a) the efficacy of the prototype (e.g., the amount of the reduction in stuttering) depends on the particular feedback mode being employed; (b) the Whisper, Reverb and Harmony modes reduce stuttering more than do the other modes employed in the prototype; and (c) the prototype effectively reduces stuttering when the prototype operates in any of the following feedback modes: Whisper, Reverb, Harmony, Retune, DJ, Pop, Bubble, Delay and Pitch-Shift.

The prototype described in the preceding 13 paragraphs is a non-limiting example of this invention. This invention may be implemented in many other ways. Among other things: (a) other hardware may be employed; and (b) other feedback modes (including other versions of the modes described above) may be employed.

Analog or Hybrid Signal Processing

This invention is not limited to digital signal processing of a user's voice. In some implementations, all or part of the audio signal processing described herein may be performed by analog hardware. Each type of digital signal processing described herein may be implemented, in whole or part, by analog hardware that includes electronic components and that performs audio signal processing.

Neurological Effects

In illustrative implementations of this invention, the audible feedback produces neurological effects in the user's brain, which tend to reduce stuttering in many use scenarios. Among other things, the reduction in stuttering may be due to one or more of the following: (a) musical perception may cause widespread, bilateral activity within multiple cortical networks; (b) altering the spoken voice into a form that is musical may enhance the flow of activity through compensatory networks (right or left hemisphere); (c) the audible feedback may generate large auditory prediction errors; (d) the externally altered sound of one's voice may lead to a mismatch when compared with one's internal expectations; and (e) very large mismatch errors may be ignored by neural systems that normally utilize error signals to guide and correct ongoing motor-speech actions, thereby allowing smaller, stuttering-associated prediction errors to pass through undetected.

In illustrative implementations of this invention, the efficacy of the audible feedback (e.g., the amount of the reduction in stuttering) depends on the particular feedback mode being employed. This is consistent with other research that has found that, when an altered version of the user's voice is played back to a user, the efficacy (in reducing the user's stuttering) of the feedback depends on which alteration(s) are made to the user's voice.

More Details

In some implementations of this invention, acoustic feedback is employed as a treatment for stuttering. High-speed digital processing may create complex vocal acoustic transformations, that may be employed to enhance fluency in people who stutter.

In some implementations of this invention, a system: (1) receives, via a microphone, digital acoustic information regarding a user's voice; (2) generates one or more types of acoustic transformations via a digital signal processor; (3) audibly feeds back these sonic alterations to the user in real-time; and (4) includes a user interface that allows the user to voluntarily change the system's settings. We sometimes call the different types of digital acoustic transformations "modes". The user interface may allow a user to control his or her feedback listening experience by toggling between modes and changing the mode's internal parameters. The system may also be set to return non-transformed versions of a user' voice to the user. An Efficacy Detector may evaluate the rate of stuttering-like-disfluencies per syllables and may feed this information in the control interface.

In some implementations of this invention, at least three types of acoustic modulation are employed to alter a user's self-perception of the user's voice, including the voice's fundamental frequency, timbre, and attack/decay characteristics. These modes may include the perception of whispering (Whisper), choral effects with harmonies based on western scales (Harmony), and changes in room acoustic (Reverb). A mode that amplifies but does not transform the voice may also be utilized (Raw Voice).

The following three paragraphs are a description (both perceptual and algorithmic) of three modes, in an illustrative embodiment of this invention.

(1) Whisper Vocal Feedback: Perceptual phonation changes obtained by convolution filter of the raw voice signal with noise filtered with a low pass filter. Parameters include: mix ratio between raw signal and output filtered signal; and shape and cutoff frequency of the noise filter.

(2) Reverberator Vocal Feedback (Schroeder or Convolution based): Perceptual change in room reverberation obtained either by convolution processing with impulse response or using a Schroeder reverberator filter. Parameters include: mix ratio between raw signal and output filtered signal; and room dimension.

(3) Harmonizer Vocal Feedback: Perceptual chorus effect obtained by vocal dubbing with several pitch-shifted versions of the original signal. Parameters include: mix ratio between raw signal and output filtered signal; musical chord use for determining the shift of the layers; and toggle between passive and active pitch shift. The active mode may also include a pitch detection phase and may determine frequency shift intervals according to the detected vocal pitch.

A study of a prototype of this invention found that these modes: (a) are effective at reducing stutter-like dysfluencies; (b) produce fluency benefits that are more pronounced those created by conventional delay and pitch-shifts; and (c) produce a better listening experience.

In illustrative implementations of this invention, the system performs acoustic digital signal transformation and allows the user to toggle between modes and to change the parameters of the modes. The system may employ any type of vocal detection apparatus (e.g., microphone) and any apparatus (e.g., headphones, earphone, earbuds, or speakers) for outputting the voice back to the user.

Instead of simply delaying or pitch-shifting the voice, the system in the present invention may create complex musically modulated feedback using embedded modules that create real-time musical accompaniments of the voice. The system may allow a user to change parameters using a connected phone application. Allowing the user to change the parameters of the musical feedback may avoid habituation, as there are many ways to transform a signal into music.

In some implementations of this invention: the system: (a) captures acoustic speech signals that are spoken by a human user; (b) performs multi-parameter acoustic digital signal transformations upon these signals; (c) audibly outputs the transformed signals in such a way that the user hears them; (d) accepts input from a user and, in response to the input, changes one or more parameters of the system; and (e) has an effect on (e.g., improves the fluency of) the user's speech in stuttering and other speech impairments.

In non-limiting examples of this invention: (a) the system may alter a digital signal to provide musicalized acoustic feedback of a user's voice in such a way as to cause an improvement in a user's speech fluency; (b) the system may employ digital signal alteration algorithms for at least three mode types, including Whisper Vocal Feedback, Reverberator Vocal Feedback, and Harmonizer Vocal Feedback, in such a way as to cause an improvement in a user's speech fluency; (c) a user may change digital transformation parameters of the system; (d) the system may determine the efficacy of a specific transformation on a specific user, and may output a visualization of the efficacy across transformations; (e) the system may prompt the user to choose a different transformation based on efficacy; and (f) the system may perform an automated method to test and adjust the transformation depending on the efficacy on a user.

Software

In the Computer Program Listing above, fourteen computer program files are listed. These fourteen computer program files comprise software employed in a prototype of this invention.

In order to submit these fourteen programs to the U.S. Patent and Trademark Office, the fourteen program files were converted to ASCII .txt format. In each of these fourteen programs, these changes may be reversed, so that the fourteen programs may be run. Specifically, these changes may be reversed by (a) deleting "_h.txt" each time that it appears in a file name of one of these fourteen programs and replacing it with ".h"; and (b) deleting "_mm.txt" each time that it appears in a file name of one of these fourteen programs and replacing it with ".mm";

This invention is not limited to the software set forth in these fourteen computer program files. Other software may be employed. Depending on the particular implementation, the software used in this invention may vary.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to control the operation of, or interface with, hardware components of an acoustic feedback system, including any microphones, digital signal processors, analog signal processors, and speakers; (2) to analyze audio signals of recorded sounds to recognize vocal activity; (3) to identify a speaker (e.g., to recognize when a voice is that of a particular user); (4) to calculate severity of stuttering; (5) to select or change feedback mode; (6) to instruct a DSP to transform an audio signal, (7) to transform an audio signal, (8) to receive data from, control, or interface with one or more sensors; (9) to perform any other calculation, computation, program, algorithm, or computer function described or implied herein; (10) to receive signals indicative of human input; (11) to output signals for controlling transducers for outputting information in human perceivable format; (12) to process data, to perform computations, and to execute any algorithm or software; and (13) to control the read or write of data to and from memory devices (tasks 1-13 of this sentence being referred to herein as the "Computer Tasks"). In some cases, the one or more computers (e.g., 105) communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Computer Readable Media

In some implementations, this invention comprises one or more computers that are programmed to perform one or more of the Computer Tasks.

In some implementations, this invention comprises one or more tangible, machine readable media, with instructions encoded thereon for one or more computers to perform one or more of the Computer Tasks. In some implementations, these one or more media are not transitory waves and are not transitory signals.

In some implementations, this invention comprises participating in a download of software, where the software comprises instructions for one or more computers to perform one or more of the Computer Tasks. For instance, the participating may comprise (a) a computer providing the software during the download, or (b) a computer receiving the software during the download.

Network Communication

In illustrative implementations of this invention, one or more devices (e.g., 101, 102, 103, 104, 105, 106) are configured for wireless or wired communication with other devices in a network.

For example, in some cases, one or more of these devices include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g., 105) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

DEFINITIONS

The terms "a" and "an", when modifying a noun, do not imply that only one of the noun exists. For example, a statement that "an apple is hanging from a branch": (i) does not imply that only one apple is hanging from the branch; (ii)

is true if one apple is hanging from the branch; and (iii) is true if multiple apples are hanging from the branch.

To compute "based on" specified data means to perform a computation that takes the specified data as an input.

The term "comprise" (and grammatical variations thereof) shall be construed as if followed by "without limitation". If A comprises B, then A includes B and may include other things.

As used herein, to "change a parameter" means to change a value of the parameter. As a non-limiting example, a parameter of gain may be changed from one decibel gain to two decibels gain.

Each of the following is a non-limiting example of a "computer", as that term is used herein: (a) a digital computer; (b) an analog computer; (c) a computer that performs both analog and digital computations; (d) a microcontroller; (e) a microprocessor; (f) a controller; (g) a tablet computer; (h) a notebook computer; (i) a laptop computer; (j) a personal computer; (k) a mainframe computer; and (l) a quantum computer. However, a human is not a "computer", as that term is used herein.

"Computer Tasks" is defined above.

"Defined Term" means a term or phrase that is set forth in quotation marks in this Definitions section.

"DSP" means digital signal processor.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"I/O" means input/output.

The abbreviation "ms" means milliseconds.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

"PET" means polyethylene terephthalate.

A non-limiting example of "playing back" a user's voice is playing back a transformed version of the user's voice.

As used herein: (a) "pseudobeat" means a time; (b) a sequence of "pseudobeats" is a sequence of times; and (c) a sequence of "pseudobeats" may occur in an irregular pattern that does not have equal temporal intervals between pseudobeats.

As used herein, to "record" sound means to convert the sound to an electrical audio signal. As used herein, to say that sound is "recorded": (a) does not imply anything regarding whether or not data encoded by the electrical audio signal is stored; and (b) does not imply anything regarding how or how long such data is stored. As a non-limiting example, if a microphone "records" a voice, the electrical audio signal that is outputted by the microphone and that encodes the voice may be streamed without being permanently stored.

As used herein, the term "set" does not include a group with no elements.

Unless the context clearly indicates otherwise, "some" means one or more.

A human is not a "speaker", as that term is used herein.

As used herein, a "subset" of a set consists of less than all of the elements of the set.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) converting sound of a user's voice into an electrical audio signal; (b) transforming the electrical audio signal to produce a transformed electrical audio signal; and (c) converting, with one or more speakers, the transformed electrical audio signal into transformed sound of the user's voice, which transformed sound is outputted by the one or more speakers in such a way as to be audible to the user; wherein (i) the transforming is performed in each of a set of modes, which set includes (A) a first mode, in which the transforming causes the transformed sound of the user's voice to have a whispered sound effect, and (B) a second mode, in which the transforming causes the transformed sound of the user's voice to have a reverberation sound effect, and (ii) each mode in the set occurs during a time period in which no other mode in the set occurs. In some cases: (a) the set of modes also includes a third mode; and (b) in the third mode, the transforming causes the transformed sound, which is outputted by the one or more speakers and is audible to the user, to comprise a superposition of the user's voice and one or more pitch-shifted versions of the user's voice that are sounded simultaneously with the user's voice, each of the one or more pitch-shifted versions being shifted in pitch, relative to the user's voice, by a frequency interval that occurs between notes of a chord in a chromatic musical scale. In some cases, the method further comprises: (a) taking measurements of stuttering by the user during each of multiple time windows in which the transforming occurs; (b) detecting, based on the measurements, an increase in the stuttering; and (c) in response to the detecting of the increase, changing which mode of transforming is occurring, by changing from one mode in the set to another mode in the set. In some cases: (a) the method further comprises performing a speaker identification algorithm to determine whether a voice is the user's voice; and (b) the transforming is performed only for time intervals in which the user is speaking. In some cases: (a) the method further comprises repeatedly sampling fundamental frequency of the user's voice during the transforming, which fundamental frequency changes over time during the transforming; (b) the set of modes also includes a third mode; and (c) in the third mode (i) the transforming causes the transformed sound, which is outputted by the one or more speakers and is audible to the user, to comprise, at each pseudobeat in a set of pseudobeats, a superposition of two or more pitch-shifted versions of the user's voice, which pitch-shifted versions are sounded simultaneously with each other, in such a way that the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the user's voice, (ii) the chord may but does not necessarily change at each pseudobeat in the set, depending on whether the fundamental frequency of the user's voice as most recently sampled has changed, (iii) the chord remains constant between each temporally adjoining pair of pseudobeats, and (iv) each pseudobeat in the set, except the initial pseudobeat of the set, occurs at the earliest time at which a build-up in amplitude of the user's voice occurs after a specified temporal interval has elapsed since the most recent pseudobeat in the set. In some cases: (a) the method further comprises repeatedly sampling fundamental frequency of the user's voice during the transforming, which fundamental frequency changes over time during the transforming; (b) the set of modes also includes a third mode; and (c) in the third mode, the transforming causes the transformed sound, which is outputted by the one or more speakers and is audible to the user, to comprise a superposition of at least the user's voice and a changing musical note, in such a way that (i) each time that the changing note is sounded, the note is equal in pitch to fundamental frequency of the user's voice as most recently sampled, and (ii) the note changes over time due to the fundamental frequency of the user's voice changing over time. In some cases, each time that the changing note is sounded, the note comprises a sound that is a recording of, or that is synthesized to emulate, a note produced by an acoustic string instrument, an acoustic wind instrument, or an acoustic percussion instrument. In some cases: (a) the method further comprises repeatedly sampling fundamental frequency of the user's voice during the transforming, which fundamental frequency changes over time during the transforming; (b) the set of modes also includes a third mode; and (c) in the third mode, the transforming causes the transformed sound, which is outputted by the one or more speakers and is audible to the user, to comprise a changing, pitch-shifted version of the user's voice, in such a way that (i) the changing, pitch-shifted version has a fundamental frequency that is, at any given time, equal in pitch to a note in a chromatic musical scale, which note is nearest in frequency to the fundamental frequency of the user's voice as most recently sampled, and (ii) the fundamental frequency of the pitch-shifted version changes over time due to the fundamental frequency of the user's voice changing over time. In some cases, the method further comprises changing, in response to input from the user: (a) which mode in the set of modes is employed in the transforming; or (b) one or more parameters of a mode in the set of modes. In some cases, the method further comprises changing, in accordance with a selection made by a computer: (a) which mode in the set of modes is employed in the transforming; or (b) one or more parameters of a mode in the set of modes. Each of the cases described above in this paragraph is an example of the method described in the first sentence of this paragraph, and is also an example of an embodiment of this invention that may be combined with other embodiments of this invention.

In some implementations, this invention is an apparatus comprising: (a) a microphone that is configured to convert sound of a user's voice into an electrical audio signal; (b) a digital signal processor that is programmed to perform a transformation which transforms the electrical audio signal into a transformed electrical audio signal; and (c) one or more speakers that are configured to convert the transformed electrical audio signal into transformed sound of the user's voice in such a way that the transformed sound is audible to the user; wherein (i) the transformation is performed in each of a set of modes, which set includes (A) a first mode, in which the transformation causes the transformed sound of the user's voice to have a whispered sound effect, and (B) a second mode, in which the transformation causes the transformed sound of the user's voice to have a reverberation sound effect, and (ii) each mode in the set occurs during a time period in which no other mode in the set occurs. In some cases, the apparatus is configured in such a way that: (a) the set of modes also includes a third mode; and (b) in the third mode, the transformation causes the transformed sound, which is outputted by the one or more speakers and is audible to the user, to comprise a superposition of the user's voice and one or more pitch-shifted versions of the user's voice that are sounded simultaneously with the user's voice, each of the one or more pitch-shifted versions being shifted in pitch, relative to the user's voice, by a frequency interval that occurs between notes of a chord in a chromatic musical scale. In some cases, the apparatus is configured: (a) to take measurements of stuttering by the user during each of multiple time windows in which the transformation occurs; (b) to detect, based on the measurements, an increase in the stuttering; and (c) in response to detecting the increase, to change which mode of transformation is occurring, by changing from one mode in the set to another mode in the set. In some cases, the apparatus is configured: (a) to perform a speaker identification algorithm to determine whether a voice is the user's voice; and (b) to perform the transformation only for time intervals in which the user is speaking. In some cases: (a) the apparatus is configured to repeatedly sample fundamental frequency of the user's voice during the transformation, which fundamental frequency changes over time during the transformation; and (b) the apparatus is configured in such a way that (i) the set of modes also includes a third mode, and (ii) in the third mode (A) the transformation causes the transformed sound, which is outputted by the one or more speakers and is audible to the user, to comprise, at each pseudobeat in a set of pseudobeats, a superposition of two or more pitch-shifted versions of the user's voice, which pitch-shifted versions are sounded simultaneously with each other, (B) the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the user's voice, (C) the chord may but does not necessarily change at each pseudobeat in the set, depending on whether the fundamental frequency of the user's voice as most recently sampled has changed, (D) the chord remains constant between each temporally adjoining pair of pseudobeats, and (E) each pseudobeat in the set, except the initial pseudobeat of the set, occurs at the earliest time at which a build-up in amplitude of the user's voice occurs after a specified temporal interval has elapsed since the most recent pseudobeat in the set. In some cases: (a) the apparatus is configured to repeatedly sample fundamental frequency of the user's voice during the transformation, which fundamental frequency changes over time during the transformation; and (b) the apparatus is configured in such a way that (i) the set of modes also includes a third mode, and (ii) in the third mode (A) the transformation causes the transformed sound, which is outputted by the one or more speakers and is audible to the user, to comprise a superposition of at least the user's voice and a changing musical note, (B) each time that the changing note is sounded, the note is equal in pitch to fundamental frequency of the user's voice as most recently sampled, and (C) the note changes over time due to the fundamental frequency of the user's voice changing over time. In some cases, the apparatus is configured in such a way that each time that the changing note is sounded, the note comprises a sound that is a recording of, or that is synthesized to emulate, a note produced by an acoustic string instrument, an acoustic wind instrument, or an acoustic percussion instrument. In some cases: (a) the apparatus is configured to repeatedly sample fundamental frequency of the user's voice during the transformation, which fundamental frequency changes over time during the transformation; and (b) the apparatus is configured in such a way that (i) the set of modes also includes a third mode, and (ii) in the third mode (A) the transformation causes the transformed sound, which is outputted by the one or more speakers and is audible to the user, to comprise a changing, pitch-shifted version of the user's voice, (B) the changing, pitch-shifted version has a fundamental frequency that is, at any given time, equal in pitch to a note in a chromatic musical scale, which note is nearest in frequency to the fundamental frequency of the user's voice as most recently sampled, and (C) the fundamental frequency of the pitch-shifted version changes over time due to the fundamental frequency of the user's voice changing over time. In some cases: (a) the apparatus further includes one or more computers; and (b) the one or more computers are programmed to analyze a user's voice to determine when (i) to change which mode in the set of modes is employed in the transforming, or (ii) to change one or more parameters of a mode in the set of modes. In some cases: (a) the apparatus further includes one or more computers; and (b) the one or more computers are programmed to accept data indicative of a user's input and to output, in accordance with the user's input, instructions (i) to change which mode in the set of modes is employed in the transforming, or (ii) to change one or more parameters of a mode in the set of modes. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
converting a sound of a voice of a user into an electrical audio signal;
transforming the electrical audio signal to produce a transformed electrical audio signal;
converting, with one or more speakers, the transformed electrical audio signal into a transformed sound of the voice of the user in real time while the user is making the sound, wherein the transformed sound is outputted in real time by the one or more speakers in such a way as to be audible to only the user to reduce stuttering by the user, wherein:
the transforming is performed in each of a set of modes, wherein the set of modes includes:
a first mode, in which the transforming causes the transformed sound of the voice of the user to have a whispered sound effect, and
a second mode, in which the transforming causes the transformed sound of the voice of the user to have a reverberation sound effect, and
a third mode, in which transforming causes the transformed sound to comprise a superposition of the voice of the user and one or more pitch-shifted versions of the voice of the user that are sounded simultaneously with the voice of the user, each of the one or more pitch-shifted versions being shifted in pitch,
relative to the voice of the user, by a frequency interval that occurs between notes of a chord in a chromatic musical scale, wherein each mode in the set occurs during a time period in which no other mode in the set occurs;
taking measurements of the stuttering by the user during each of multiple time windows in which the transforming occurs;
detecting, based on the measurements, an increase in the stuttering; and
in response to the detecting of the increase in the stuttering, changing which mode of transforming is occurring, by changing from one mode in the set to another mode in the set to reduce the stuttering by the user.

2. The method of claim 1, further comprising performing a speaker identification algorithm to determine whether a voice is the voice of the user, and
wherein the transforming is performed only for time intervals in which the user is speaking.

3. The method of claim 1, further comprising repeatedly sampling fundamental frequency of the voice of the user during the transforming, which fundamental frequency changes over time during the transforming,
wherein:
the set of modes also includes a fourth mode; and
in the fourth mode,
the transforming causes the transformed sound, which is outputted by the one or more speakers and is audible to only the user, to comprise, at each pseudobeat in a set of pseudobeats, a superposition of two or more pitch-shifted versions of the voice of the user, which pitch-shifted versions are sounded simultaneously with each other, in such a way that the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the voice of the user,
the chord may but does not necessarily change at each pseudobeat in the set, depending on whether the fundamental frequency of the voice of the user as most recently sampled has changed,
the chord remains constant between each temporally adjoining pair of pseudobeats, and
each pseudobeat in the set, except an initial pseudobeat of the set, occurs at the earliest time at which a build-up in amplitude of the voice of the user occurs after a specified temporal interval has elapsed since the most recent pseudobeat in the set.

4. The method of claim 1, further comprising repeatedly sampling fundamental frequency of the voice of the user during the transforming, which fundamental frequency changes over time during the transforming,
wherein:
the set of modes also includes a fourth third mode; and
in the fourth mode, the transforming causes the transformed sound, which is outputted by the one or more speakers and is audible to only the user, to comprise a superposition of at least the voice of the user and a changing musical note, in such a way that:
each time that the changing note is sounded, the note is equal in pitch to fundamental frequency of the voice of the user as most recently sampled, and
the note changes over time due to the fundamental frequency of the voice of the user changing over time.

5. The method of claim 4, wherein, each time that the changing note is sounded, the note comprises a sound that is a recording of, or that is synthesized to emulate, a note produced by an acoustic string instrument, an acoustic wind instrument, or an acoustic percussion instrument.

6. The method of claim 1, further comprising repeatedly sampling fundamental frequency of the voice of the user during the transforming, which fundamental frequency changes over time during the transforming,
wherein:
the set of modes also includes a fourth mode; and
in the fourth mode, the transforming causes the transformed sound, which is outputted by the one or more speakers and is audible to only the user, to comprise a changing, pitch-shifted version of the voice of the user, in such a way that:
the changing, pitch-shifted version has a fundamental frequency that is, at any given time, equal in pitch to a note in a chromatic musical scale, which note is nearest in frequency to the fundamental frequency of the voice of the user as most recently sampled, and
the fundamental frequency of the pitch-shifted version changes over time due to the fundamental frequency of the voice of the user changing over time.

7. The method of claim 1, further comprising changing, in response to input from the user:
which mode in the set of modes is employed in the transforming; or
one or more parameters of a mode in the set of modes.

8. The method of claim 1, further comprising changing, in accordance with a selection made by a computer:
which mode in the set of modes is employed in the transforming; or
one or more parameters of a mode in the set of modes.

9. The method of claim 1, wherein a latency of the transformed sound with respect to the voice of the user is no more than 30 ms.

10. The method of claim 1, wherein the set of modes further comprises a delay mode, and wherein, in the delay mode, a latency of the transformed sound with respect to the voice of the user is between 50 milliseconds to 200 milliseconds.

11. An apparatus comprising:
a microphone that is configured to convert sound of a voice of a user into an electrical audio signal;
a digital signal processor that is programmed to perform a transformation which transforms the electrical audio signal into a transformed electrical audio signal; and
one or more speakers that are configured to convert the transformed electrical audio signal into transformed sound of the voice of the user in real time while the user is making the sound in such a way that the transformed sound is audible to only the user to reduce stuttering by the user;
wherein:
the transformation is performed in each of a set of modes, which set includes:
a first mode, in which the transformation causes the transformed sound of the voice of the user to have a whispered sound effect,
a second mode, in which the transformation causes the transformed sound of the user voice to have a reverberation sound effect,
in a third mode, in which the transformation causes the transformed sound, which is outputted by the one or more speakers and is audible to only the user, to comprise a superposition of the voice of the user and one or more pitch-shifted versions of the voice of the user that are sounded simultaneously with the voice of the user, each of the one or more pitch-shifted versions being shifted in pitch, relative to the voice of the user, by a frequency interval that occurs between notes of a chord in a chromatic musical scale, wherein each mode in the set occurs during a time period in which no other mode in the set occurs, and
wherein the apparatus is configured to:
take measurements of the stuttering by the user during each of multiple time windows in which the transformation occurs;
detect, based on the measurements, an increase in the stuttering; and
in response to detecting the increase in the stuttering, change which mode of transformation is occurring, by changing from one mode in the set to another mode in the set to reduce the stuttering by the user.

12. The apparatus of claim 11, wherein the apparatus is configured to:
perform a speaker identification algorithm to determine whether a voice is the voice of the user; and
perform the transformation only for time intervals in which the user is speaking.

13. The apparatus of claim 11, wherein:
the apparatus is configured to repeatedly sample fundamental frequency of the voice of the user during the transformation, which fundamental frequency changes over time during the transformation; and
the apparatus is configured in such a way that:
the set of modes also includes a fourth mode, and
in the fourth mode,
the transformation causes the transformed sound, which is outputted by the one or more speakers and is audible to the user, to comprise, at each pseudobeat in a set of pseudobeats, a superposition of two or more pitch-shifted versions of the voice of the user, which pitch-shifted versions are sounded simultaneously with each other,
the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the voice of the user,
the chord may but does not necessarily change at each pseudobeat in the set, depending on whether the fundamental frequency of the voice of the user as most recently sampled has changed,
the chord remains constant between each temporally adjoining pair of pseudobeats, and
each pseudobeat in the set, except an initial pseudobeat of the set, occurs at the earliest time at which a build-up in amplitude of the voice of the user occurs after a specified temporal interval has elapsed since the most recent pseudobeat in the set.

14. The apparatus of claim 11, wherein:
the apparatus is configured to repeatedly sample fundamental frequency of the voice of the user during the transformation, which fundamental frequency changes over time during the transformation; and
the apparatus is configured in such a way that:
the set of modes also includes a fourth mode, and
in the fourth mode,
the transformation causes the transformed sound, which is outputted by the one or more speakers and is audible only to the user, to comprise a superposition of at least the voice of the user and a changing musical note,
each time that the changing note is sounded, the note is equal in pitch to fundamental frequency of the voice of the user as most recently sampled, and
the note changes over time due to the fundamental frequency of the user voice changing over time.

15. The apparatus of claim 14, wherein the apparatus is configured in such a way that each time that the changing note is sounded, the note comprises a sound that is a recording of, or that is synthesized to emulate, a note produced by an acoustic string instrument, an acoustic wind instrument, or an acoustic percussion instrument.

16. The apparatus of claim 11, wherein:
the apparatus is configured to repeatedly sample fundamental frequency of the voice of the user during the transformation, which fundamental frequency changes over time during the transformation; and
the apparatus is configured in such a way that:
the set of modes also includes a fourth mode, and
in the fourth mode
the transformation causes the transformed sound, which is outputted by the one or more speakers and is audible to only the user, to comprise a changing, pitch-shifted version of the voice of the user,
the changing, pitch-shifted version has a fundamental frequency that is, at any given time, equal in pitch to a note in a chromatic musical scale, which note is nearest in frequency to the fundamental frequency of the voice of the user as most recently sampled, and the fundamental frequency of the pitch-shifted version changes over time due to the fundamental frequency of the voice of the user changing over time.

17. The apparatus of claim 11, wherein:
the apparatus further includes one or more computers; and
the one or more computers are programmed to analyze a voice of the user to determine when:
  to change which mode in the set of modes is employed in the transforming, or
  to change one or more parameters of a mode in the set of modes.

18. The apparatus of claim 11, wherein:
the apparatus further includes one or more computers; and
the one or more computers are programmed to accept data indicative of a user's input and to output, in accordance with the user's input, instructions:
  to change which mode in the set of modes is employed in the transforming, or
  to change one or more parameters of a mode in the set of modes.

19. The apparatus of claim 11, wherein the apparatus is configured to:
repeatedly sample fundamental frequency of the voice of the user during the transformation, which fundamental frequency changes over time during the transformation;
perform a speaker identification algorithm to determine whether a voice is the voice of the user; and
perform the transformation only for time intervals in which the user is speaking,
wherein the apparatus is configured in such a way that:
  the set of modes also includes a fourth mode; and
  in the fourth mode, the transformation causes the transformed sound to comprise a superposition of the voice of the user and one or more pitch-shifted versions of the voice of the user that are sounded simultaneously with the voice of the user, each of the one or more pitch-shifted versions being shifted in pitch, relative to the voice of the user, by a frequency interval that occurs between notes of a chord in a chromatic musical scale,
wherein the apparatus is configured in such a way that:
  the set of modes also includes a fifth mode; and
  in the fifth mode the transformation causes the transformed sound, which is outputted by the one or more speakers and is audible to the user, to comprise, at each pseudobeat in a set of pseudobeats, a superposition of two or more pitch-shifted versions of the voice of the user, which pitch-shifted versions are sounded simultaneously with each other, the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the voice of the user, the chord may but does not necessarily change at each pseudobeat in the set, depending on whether the fundamental frequency of the voice of the user as most recently sampled has changed, the chord remains constant between each temporally adjoining pair of pseudobeats, and each pseudobeat in the set, except an initial pseudobeat of the set, occurs at the earliest time at which a build-up in amplitude of the voice of the user occurs after a specified temporal interval has elapsed since the most recent pseudobeat in the set.

20. The apparatus of claim 11, wherein a latency of the transformed sound with respect to the voice of the user is no more than 30 ms.

21. The apparatus of claim 11, wherein the set of modes further comprises a delay mode, and wherein, in the delay mode, a latency of the transformed sound with respect to the voice of the user is between 50 milliseconds to 200 milliseconds.

22. A method comprising:
converting a sound of a voice of a user into an electrical audio signal;
transforming the electrical audio signal to produce a transformed electrical audio signal;
converting, with one or more speakers, the transformed electrical audio signal into a transformed sound of the voice of the user in real time while the user is making the sound,
wherein the transformed sound is outputted in real time by the one or more speakers in such a way as to be audible to only the user to reduce stuttering by the user, performing a speaker identification algorithm to determine whether a voice is the voice of the user; and
repeatedly sampling fundamental frequency of the voice of the user during the transforming, which fundamental frequency changes over time during the transforming,
wherein the transforming is performed only for time intervals in which the user is speaking, the transforming is performed in each of a set of modes, wherein the set of modes includes:
a first mode, in which the transforming causes the transformed sound of the voice of the user to have a whispered sound effect,
a second mode, in which the transforming causes the transformed sound of the voice of the user to have a reverberation sound effect,
a third mode, in which transforming causes the transformed sound to comprise a superposition of the voice of the user and one or more pitch-shifted versions of the voice of the user that are sounded simultaneously with the voice of the user, each of the one or more pitch-shifted versions being shifted in pitch, relative to the voice of the user, by a frequency interval that occurs between notes of a chord in a chromatic musical scale,
a fourth mode, in which the transforming causes the transformed sound to comprise a superposition of the voice of the user and one or more pitch-shifted versions of the voice of the user that are sounded simultaneously with the voice of the user, each of the one or more pitch-shifted versions being shifted in pitch, relative to the voice of the user, by a frequency interval that occurs between notes of a chord in a chromatic musical scale, and
a fifth mode; and
wherein the transforming causes the transformed sound to comprise, at each pseudobeat in a set of pseudobeats, a superposition of two or more pitch-shifted versions of the voice of the user, which pitch-shifted versions are sounded simultaneously with each other, in such a way that the fundamental frequencies of the respective pitch-shifted versions together form a chord in a chromatic musical scale, which chord has a root note that is the fundamental frequency of one of the pitch-shifted versions and is the nearest note in the scale to the fundamental frequency of the voice of the user, the chord may but does not necessarily change at each pseudobeat in the set, depending on whether the fundamental frequency of the voice of the user as most recently sampled has changed, the chord remains constant between each temporally adjoining pair of pseudobeats, and each pseudobeat in the set, except an initial pseudobeat of the set, occurs at the earliest time at which a build-up in amplitude of the voice of the user occurs after a specified temporal interval has elapsed since the most recent pseudobeat in the set, wherein each mode in the set occurs during a time period in which no other mode in the set occurs;

taking measurements of the stuttering by the user during each of multiple time windows in which the transforming occurs;

detecting, based on the measurements, an increase in the stuttering; and in response to the detecting of the increase in the stuttering, changing which mode of transforming is occurring, by changing from one mode in the set to another mode in the set to reduce the stuttering by the user.

23. The method of claim 22, wherein a latency of the transformed sound with respect to the voice of the user is no more than 30 ms.

24. The method of claim 22, wherein the set of modes further comprises a delay mode, and wherein, in the delay mode, a latency of the transformed sound with respect to the voice of the user is between 50 milliseconds to 200 milliseconds.

* * * * *